United States Patent
Boettcher et al.

(10) Patent No.: US 12,130,187 B2
(45) Date of Patent: Oct. 29, 2024

(54) OPTICAL-BASED FIRE DETECTION SYSTEMS AND METHODS

(71) Applicant: The Boeing Company, Chicago, IL (US)

(72) Inventors: Philipp A. Boettcher, Golden, CO (US); Jason S. Damazo, Seattle, WA (US)

(73) Assignee: The Boeing Company, Arlington, VA (US)

( * ) Notice: Subject to any disclaimer, the term of this patent is extended or adjusted under 35 U.S.C. 154(b) by 189 days.

(21) Appl. No.: 17/805,925

(22) Filed: Jun. 8, 2022

(65) Prior Publication Data

US 2023/0400356 A1    Dec. 14, 2023

(51) Int. Cl.
*G01J 9/00* (2006.01)
*G08B 17/12* (2006.01)

(52) U.S. Cl.
CPC .............. *G01J 9/00* (2013.01); *G08B 17/125* (2013.01)

(58) Field of Classification Search
CPC ................................ G01J 9/00; G08B 17/125
See application file for complete search history.

(56) References Cited

U.S. PATENT DOCUMENTS

| | | |
|---|---|---|
| 9,248,326 B2 | 2/2016 | Meier et al. |
| 10,238,901 B2 | 3/2019 | Ferguson et al. |

(Continued)

FOREIGN PATENT DOCUMENTS

| | | | |
|---|---|---|---|
| CA | 2 784 022 | 3/2013 | |
| CN | 108072505 A | * 5/2018 | ............. G01K 11/32 |

(Continued)

OTHER PUBLICATIONS

European Patent Office, Extended European Search Report, App. No. 23177858.0 (Nov. 2, 2023).

(Continued)

*Primary Examiner* — David P Porta
*Assistant Examiner* — Fani Polyzos Boosalis
(74) *Attorney, Agent, or Firm* — Walters & Wasylyna LLC

(57) ABSTRACT

An optical-based fire detection system has a fire detecting mode in which the system is monitoring a flammable region for occurrence of fire in the flammable region and a system calibrating mode in which functionality of the system can be verified. The system comprises a light signal collecting unit located inside of the flammable region. The system also comprises a light signal processing unit located outside of the flammable region. The system further comprises a light signal calibrating unit located outside of the flammable region. The system also comprises one or more optical fiber bundles optically interconnecting the collecting unit, the processing unit, and the calibrating unit. The optical interconnections, when the fire detection system is in the fire detecting mode, enable the processing unit to receive at least one light signal from the collecting unit and to process one or more characteristics of the at least one light signal to determine if the at least one light signal is indicative of a fire in the flammable region. The optical interconnections, when the fire detection is in the system calibrating mode, enable the processing unit to receive at least one calibrating light signal from the calibrating unit and to process the at least one calibrating light signal to verify functionality of the collecting unit and thereby to verify functionality of the optical-based fire detection system.

30 Claims, 9 Drawing Sheets

(56) References Cited

U.S. PATENT DOCUMENTS

| | | |
|---|---|---|
| 11,067,457 B2 | 7/2021 | Birnkrant et al. |
| 2021/0209918 A1 * | 7/2021 | Birnkrant ............. G08B 17/107 |

FOREIGN PATENT DOCUMENTS

| | | | | |
|---|---|---|---|---|
| EP | 2 511 888 | | 10/2012 | |
| GB | 2616457 A | * | 9/2023 | ............. G01M 3/04 |
| JP | H06 282774 | | 10/1994 | |
| WO | WO 2016/111886 | | 7/2016 | |
| WO | WO 2017/044355 | | 3/2017 | |

OTHER PUBLICATIONS

Kidde Technologies' Optical Flame Detection (OFD) https://kiddetechnologies.com/products/detail/optical-flame-detection.

* cited by examiner

OPTICAL-BASED FIRE DETECTION SYSTEMS AND METHODS

FIELD

The present application relates to fire detection systems, and is particularly directed to optical-based fire detection systems and methods.

BACKGROUND

Fire detection systems that employ eutectic wires are known. In this type of fire detection system, a eutectic wire is melted by flames of a fire to indicate occurrence of the fire. A drawback in using this type of fire detection system is that the eutectic wire is a one-time use item. As such, the typical fire detection system can only be used once. Another drawback is that the specific location of the fire is not indicated when the eutectic wire is melted.

Fire detection systems that employ optical fire detectors are also known. In this type of fire detection system, an optical fire detector receives light from flames of a fire. The light is processed to provide a signal indicative of occurrence of fire. A drawback in using this type of fire detection system is that the system may not be capable of discriminating between light from an actual fire and light from background light radiation. As such, the typical fire detection system employing optical fire detectors can provide a false positive of an occurrence of fire. Another drawback is that calibration of the fire detection system including its optical fire detectors may fall out of calibration over time. As a result, the fire detection system may not indicate occurrence of fire when an actual fire has occurred. It would be desirable to overcome drawbacks of known fire detection systems including optical-based fire detection systems.

SUMMARY

In one aspect, a method is provided of operating an optical-based fire detection system. The method comprises monitoring a flammable region for occurrence of a fire in the flammable region. The method also comprises collecting light emitted from the flammable region. The method further comprises directing collected light to a light signal processing unit that is located outside of the flammable region. The method further comprises processing the collected light at the light signal processing unit that is located outside of the flammable region to determine if the collected light is indicative of a fire in the flammable region.

In another aspect, an apparatus is provided for monitoring a flammable region for occurrence of a fire in the flammable region. The apparatus comprises a light signal collecting unit located inside of the flammable region, and a light signal processing unit located outside of the flammable region. The apparatus also comprises one or more optical fiber bundles optically interconnecting the light signal collecting unit and the light signal processing unit. The optical interconnections enable the light signal processing unit to receive at least one light signal from the light signal collecting unit and to process one or more characteristics of the at least one light signal to determine if the at least one light signal is indicative of a fire in the flammable region.

In yet another aspect, a method is provided of verifying functionality of an optical-based fire detection system that monitors a flammable region for occurrence of a fire in the flammable region. The method comprises emitting light in the flammable region. The method also comprises collecting emitted light. The method further comprises directing collected light to a light signal processing unit that is located outside of the flammable region to allow the light signal processing unit to process the collected light to verify functionality of the optical-based fire detection system.

In still another aspect, an apparatus is provided for verifying functionality of an optical-based fire detection system that is monitoring a flammable region for occurrence of a fire in the flammable region. The apparatus comprise a light signal collecting unit located inside of the flammable region. The apparatus also comprises a light signal processing unit located outside of the flammable region. The apparatus further comprises one or more optical fiber bundles optically interconnecting the light signal collecting unit and the light signal processing unit. The optical interconnections enable the light signal processing unit to receive at least one light signal from the light signal collecting unit and to process the at least one light signal to verify functionality of the light signal collecting unit and thereby to verify functionality of the optical-based fire detection system.

In another aspect, an optical-based fire detection system has a fire detecting mode in which the system is monitoring a flammable region for occurrence of fire in the flammable region and a system calibrating mode in which functionality of the system can be verified. The optical-based fire detection system comprises a light signal collecting unit located inside of the flammable region. The optical-based fire detection system also comprises a light signal processing unit located outside of the flammable region. The optical-based fire detection system further comprises a light signal calibrating unit located outside of the flammable region. The optical-based fire detection system also comprises one or more optical fiber bundles optically interconnecting the light signal collecting unit, the light signal processing unit, and the light signal calibrating unit. The optical interconnections, when the fire detection system is in the fire detecting mode, enable the light signal processing unit to receive at least one light signal from the light signal collecting unit and to process one or more characteristics of the at least one light signal to determine if the at least one light signal is indicative of a fire in the flammable region. The optical interconnections, when the fire detection is in the system calibrating mode, enable the light signal processing unit to receive at least one calibrating light signal from the light signal calibrating unit and to process the at least one calibrating light signal to verify functionality of the light signal collecting unit and thereby to verify functionality of the optical-based fire detection system.

Other aspects will become apparent from the following detailed description, the accompanying drawings and the appended claims.

DETAILED DESCRIPTION

The present application is directed to optical-based fire detection systems and methods. The specific optical-based fire detection system and method, and the industry in which the system and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes optical-based fire detection systems and methods implemented by The Boeing Company for aircraft in compliance with Federal Aviation Administration (FAA) regulations. Specifications of FAA regulations are known and, therefore, will not be described.

Figure 1:
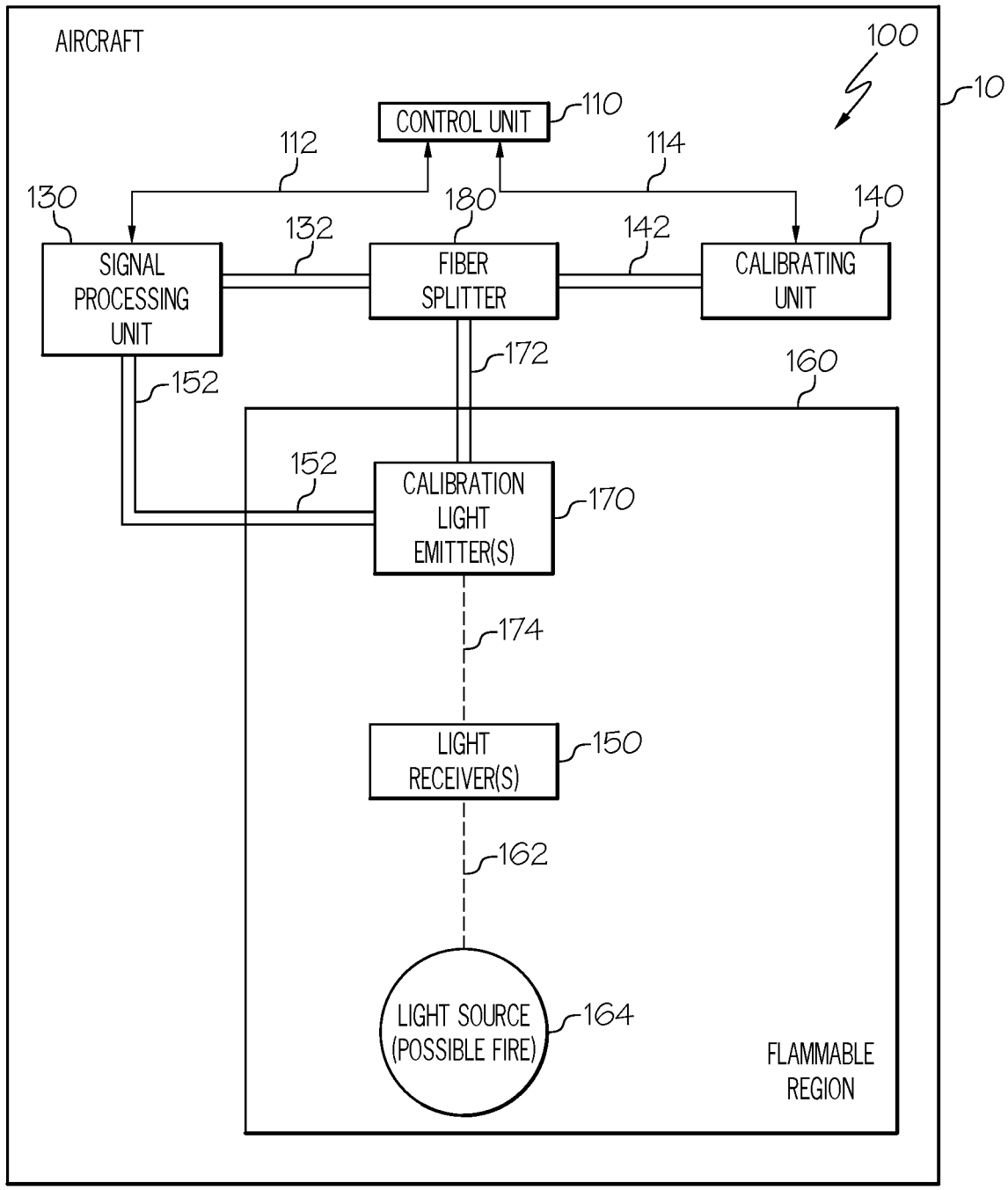
FIG. 1 is a schematic block diagram of an aircraft embodying an example optical-based fire detection system having a fire detecting mode and a system calibrating mode in accordance with an example implementation.

Referring to FIG. 1, an aircraft 10 embodying an example optical-based fire detection system 100 having a fire detecting mode and a system calibrating mode in accordance with an example implementation is illustrated. In FIG. 1, single-solid lines represent electrical connection lines between components, double-solid lines represent fiber optic connection lines between components, and single-dashed lines represent emitted light from a source. The fire detection system 100 may be used in any application of the aircraft 10, such as a fuel tank (not shown) of the aircraft 10.

In the example implementation illustrated in FIG. 1, the aircraft 10 may be any type of vehicle. For example and without limitation, the aircraft 10 may be a fixed wing, a rotary wing, or a lighter than air aircraft. The aircraft 10 may be manned or unmanned. As an example, the aircraft 10 may be a commercial passenger aircraft operated by an airline, a cargo aircraft operated by a private or public entity, a military aircraft operated by a military or other government organization, a personal aircraft operated by an individual, or any other type of aircraft operated by any other aircraft operator. As another example, the aircraft 10 may be an unmanned aerial vehicle (UAV) operated by a remote operator. Thus, those skilled in the art will appreciate that the aircraft 10 may be designed to perform any mission and may be operated by any operator.

The example implementation of FIG. 1 is especially applicable in certain locations of the aircraft 10. For example, the implementation of FIG. 1 may be applied in an engine compartment, an auxiliary power unit (APU) compartment, or a cargo compartment of the aircraft 10. As another example, the implementation of FIG. 1 may be applied in a fuel tank or a flammable leakage zone. Other applications are possible.

Figure 2:
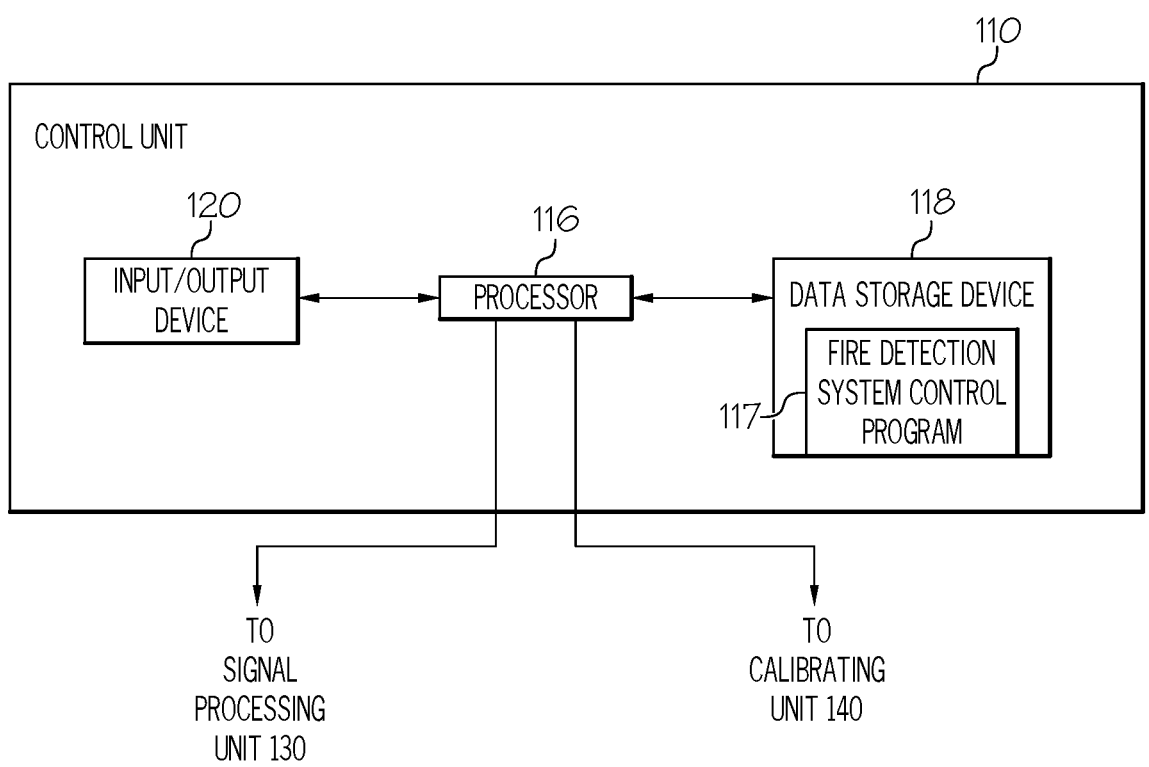
FIG. 2 shows an example control unit used in the optical-based fire detection system of FIG. 1.

The optical-based fire detection system 100 includes a control unit 110 connected via line 112 to a light signal processing unit 130 and via line 114 to a light signal calibrating unit 140. As shown in FIG. 2, the control unit 110 includes a processor 116 that executes instructions of a fire detection system control program 117 stored in an internal data storage device 118, an external data storage device (not shown), or a combination thereof to control the signal processing unit 130 and the calibrating unit 140. The processor 116 may comprise any type of technology. For example, the processor 116 may comprise a dedicated-purpose electronic processor. Other types of processors and technologies are possible. The internal data storage device 118 may comprise any type of technology. For examples, the internal data storage device 118 may comprise random access memory (RAM), read only memory (ROM), solid state memory, or any combination thereof. Other types of data storage devices and technologies are possible.

The control unit 110 further includes an input/output (I/O) device 120 that may comprise any type of technology. For example, the I/O device 120 may comprise a keypad, a keyboard, a touch-sensitive display screen, a liquid crystal display (LCD) screen, a microphone, a speaker, or any combination thereof. Other types of I/O devices and technologies are possible.

Referring again to FIG. 1, the fire detection system 100 includes a light signal collecting unit 150 in the form of one or more light receivers that are located inside of a flammable region 160. The one or more light receivers 150 may comprise any number of the same type of light receiver, any combination of different types of light receivers, and may be arranged or mounted in any manner in any position in any orientation inside of the flammable region 160. As an example, the one or more light receivers 150 may comprise a fish-eye lens. Other types of optical lens are possible.

The fire detection system 100 also includes one or more calibration light emitters 170 that are located inside of the flammable region 160. The one or more light emitters 170 may comprise any number of the same type of light emitter, any combination of different types of emitters, and may be arranged or mounted in any manner in any position in any orientation inside of the flammable region 160. As an example, the one or more light emitters 170 may comprise a directional light emitter, an omnidirectional light emitter, an indirect light emitter, an array of light emitting diodes (LEDs), or any combination thereof. As another example, the one or more light emitters 170 may comprise a portable light source that has been hand-carried by a user into the flammable region 160 to enable the user to manually operate the portable light source to emit light of a number of predetermined wavelengths and a number of predetermined intensities in the flammable region 160.

The fire detection system 100 further includes an optical fiber splitter 180 that optically interconnects the one or more light emitters 170 on line 172, the signal processing unit 130 on line 132, and the calibrating unit 140 on line 142. The signal processing unit 130 and the one or more light receivers 150 are optically interconnected via line 152. Lines 132, 142, 152, and 172 comprise one or more optical fiber bundles that optically interconnect the signal processing unit 130, the calibrating unit 140, the light receivers 150, and the light emitters 170.

The light receivers 150 receive radiated light on line 174 from the light emitters 170 when the fire detection system 100 is in the system calibrating mode. The light receivers 150 receive radiated light on line 162 from a light source 164 (e.g., a possible fire) when the fire detection system 100 is in the fire detecting mode.

Figure 3:
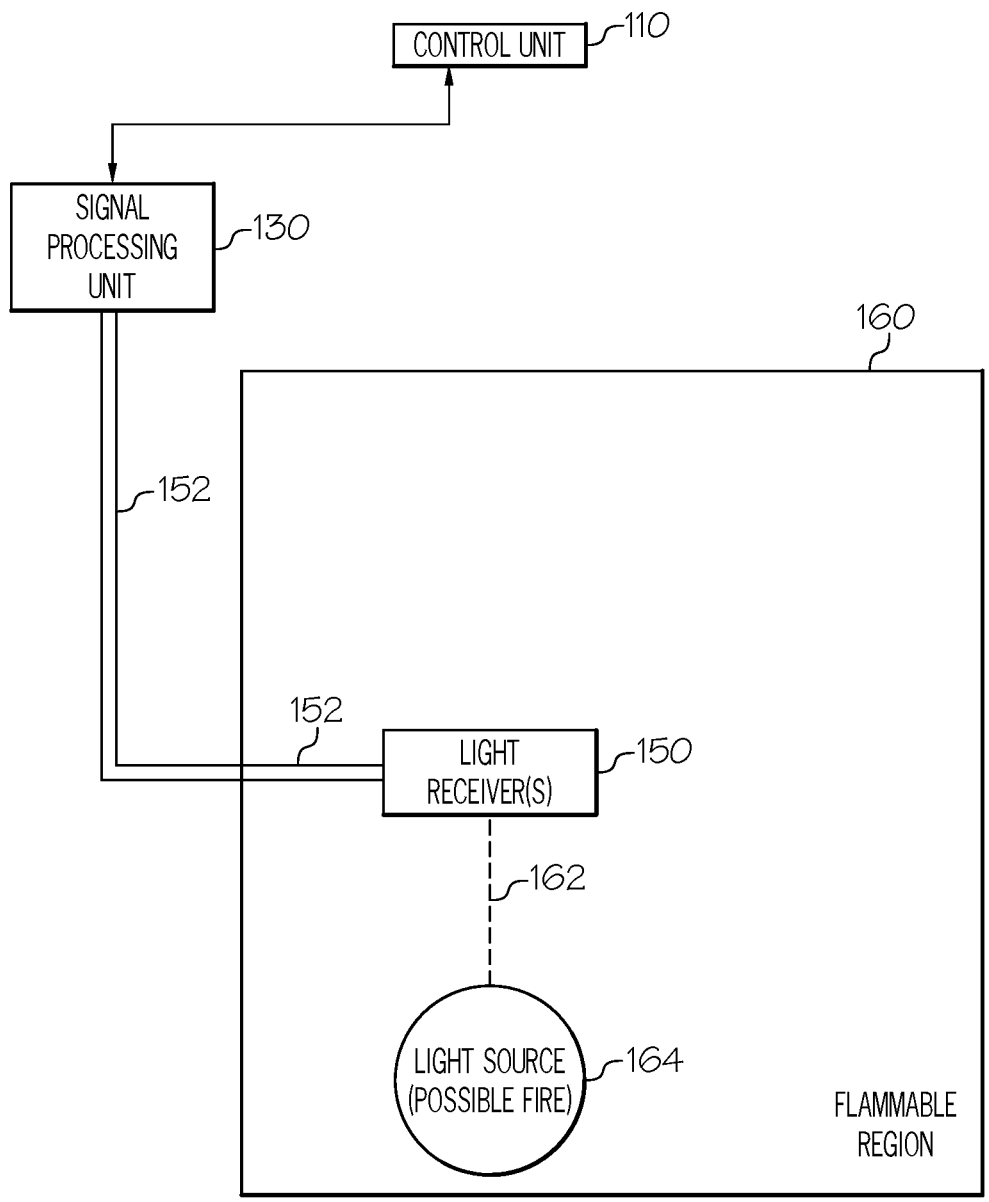
FIG. 3 is a reduced representation of the schematic block diagram of FIG. 1, and showing only active components of the fire detection system in the fire detecting mode in accordance with an embodiment.

Referring to FIG. 3, a reduced representation of the schematic block diagram of FIG. 1 is illustrated. More specifically, FIG. 3 shows only active components of the fire detection system 100 in the fire detecting mode in accordance with an embodiment. When the fire detection system 100 is in the fire detecting mode, the signal processing unit 130 receives at least one light signal on line 152 from the light receivers 150. The light signal on line 152 is the output from the light receivers 150 in response to radiated light on line 162 from the light source 164, which could be a possible fire. The signal processing unit 130 then processes one or more characteristics of the at least one light signal on line 152 to determine if the at least one light signal is indicative of a fire (i.e., if the radiated light on line 162 from the light source 164 is indicative of a fire) in the flammable region 160.

Figure 4:
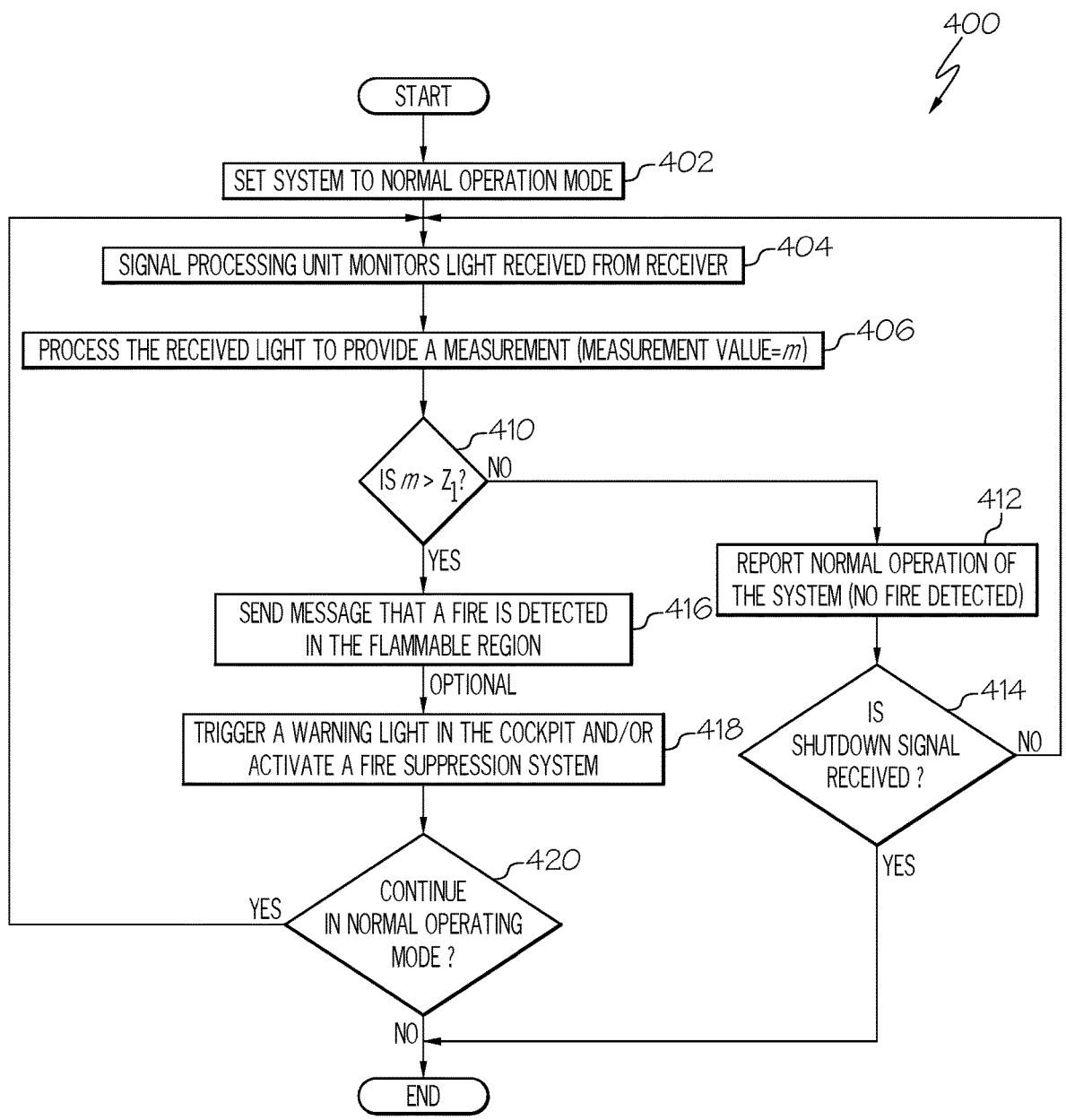
FIG. 4 is a flow diagram depicting an example method for operating the control unit of FIG. 2 during the fire detecting mode of FIG. 3.

Referring to FIG. 4, a flow diagram 400 depicting an example method for operating the control unit 110 of FIG. 2 during the fire detecting mode of FIG. 3 is illustrated. In block 402, the fire detection system 100 is set to normal operation mode (i.e., the fire detecting mode). As shown in block 404, the signal processing unit 130 monitors light received from the one or more light receivers 150. Then in block 406, the signal processing unit 130 processes the light received from the light receivers 150 to provide a measurement value that is set equal to "m". The process then proceeds to block 410.

In block 410, a determination is made as to whether the measurement value m is greater than "$Z_1$", which is a calibrated detection threshold value that is set during the system calibrating mode, as will be described later herein with reference to the flow diagram of FIG. 7. If the determination in block 410 is negative (i.e., the measurement value m is not greater than the calibrated detection threshold value $Z_1$), the process proceeds to block 412. In block 412, normal operation of the fire detection system 100 is reported, which means that no fire is detected in the flammable region 160 based upon the measurement value m that was provided in block 406.

The process then proceeds to block 414 in which a determination is made as to whether a shutdown signal is received for shutting down the fire detection system 100. If the determination in block 414 is negative (i.e., there is no signal received to shut down the fire detection system 100), the process returns back to block 404 to continue monitoring light received from the light receivers 150. However, if the determination in block 414 is affirmative (i.e., there is a signal received to shut down the fire detection system 100), the process ends.

However, if the determination back in block 410 is affirmative (i.e., the measurement value m is greater than the calibrated detection threshold value $Z_1$), the process proceeds to block 416. In block 416, a message is sent to indicate that a fire is detected in the flammable region 160. Optionally in block 418, a warning device (e.g., either visually or audibly) may be triggered in the cockpit of the aircraft 10 (FIG. 1), or a fire suppression system may be activated, or both. These are only examples of devices and systems which may be triggered in response to detecting a fire in the flammable region 160. Other types of devices and systems which can be triggered are possible.

The process then proceeds to block 420 in which a determination is made as to whether the fire detection system 100 is to continue operating in normal operation mode (i.e., the fire detecting mode). If the determination in block 420 is affirmative (i.e., continue operating in the fire detecting mode), the process returns back to block 404 to continue monitoring light received from the light receivers 150. However, if the determination in block 420 is negative (i.e., discontinue operating in the fire detecting mode), the process ends.

Figure 5:
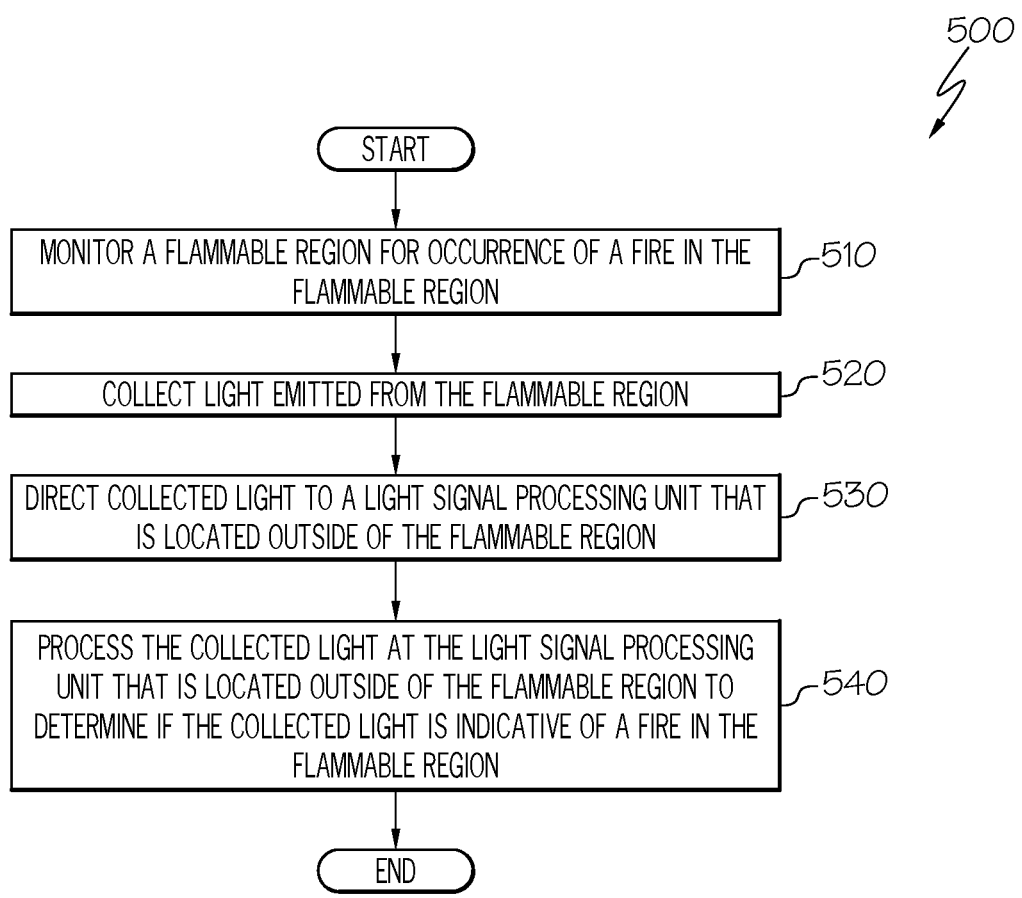
FIG. 5 is a flow diagram depicting another example method for operating the control unit of FIG. 2 during the fire detecting mode of FIG. 3.

Referring to FIG. 5, a flow diagram 500 depicting another example method for operating the control unit 110 of FIG. 2 during the fire detecting mode of FIG. 3 is illustrated. In block 510, a flammable region is monitored for occurrence of a fire in the flammable region. In block 520, light emitted from the flammable region is collected, as shown in block 520. Then in block 530, the collected light is directed to a light signal processing unit that is located outside of the flammable region. In block 540, the collected light is processed at the light signal processing unit that is located outside of the flammable region to determine if the collected light is indicative of a fire in the flammable region. The process then ends.

In some embodiments, wavelengths and intensities of the collected light are processed to determine if the collected light is indicative of a fire in the flammable region.

In some embodiments, emitted light that is only inside of the flammable region is collected In some embodiments, collected light is directed via one or more optical fiber bundles to the light signal processing unit.

Figure 6:
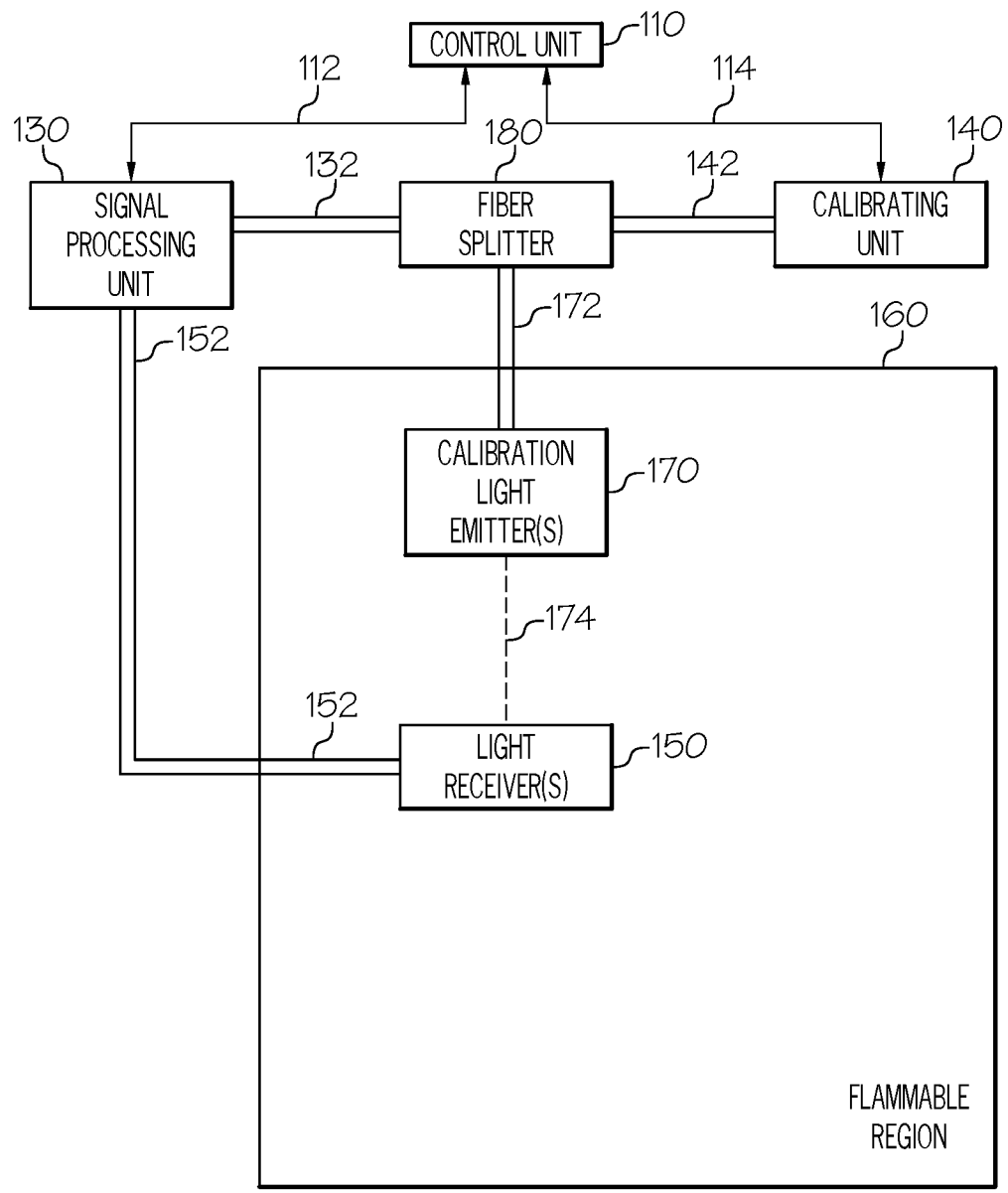
FIG. 6 is a reduced representation of the schematic block diagram of FIG. 1, and showing only active components of the fire detection system in the system calibrating mode in accordance with an embodiment.

Referring to FIG. 6, a reduced representation of the schematic block diagram of FIG. 1 is illustrated. More specifically, FIG. 6 shows only active components of the fire detection system 100 in the system calibrating mode in accordance with an embodiment. When the fire detection system 100 is in the system calibrating mode, the control unit 110 controls the calibrating unit 130 to emit at least one calibrating light signal on line 142 to the fiber splitter 180. The emitted light signal has a number of predetermined wavelengths and a number of predetermined intensities. The fiber splitter splits the emitted light between the signal processing unit 130 and the light receivers 150. As an example, the emitted light may be split with 95% going on line 172 to the light emitters 170 and 5% going on line 132 to the signal processing unit 130. Other split percentages, such as 90%-10% or 99%-1%, are possible.

In response to the light received on line 172 from the fiber splitter 180, the light emitters 170 provide radiated light on line 174. The light receivers 150 then provide at least one light signal on line 152 to the signal processing unit 130 in response to the light on line 174. The signal processing unit 130 then processes the at least one light signal on line 152 to verify functionality of the light receivers 150 and thereby to verify functionality of the fire detection system 100.

Figure 7:
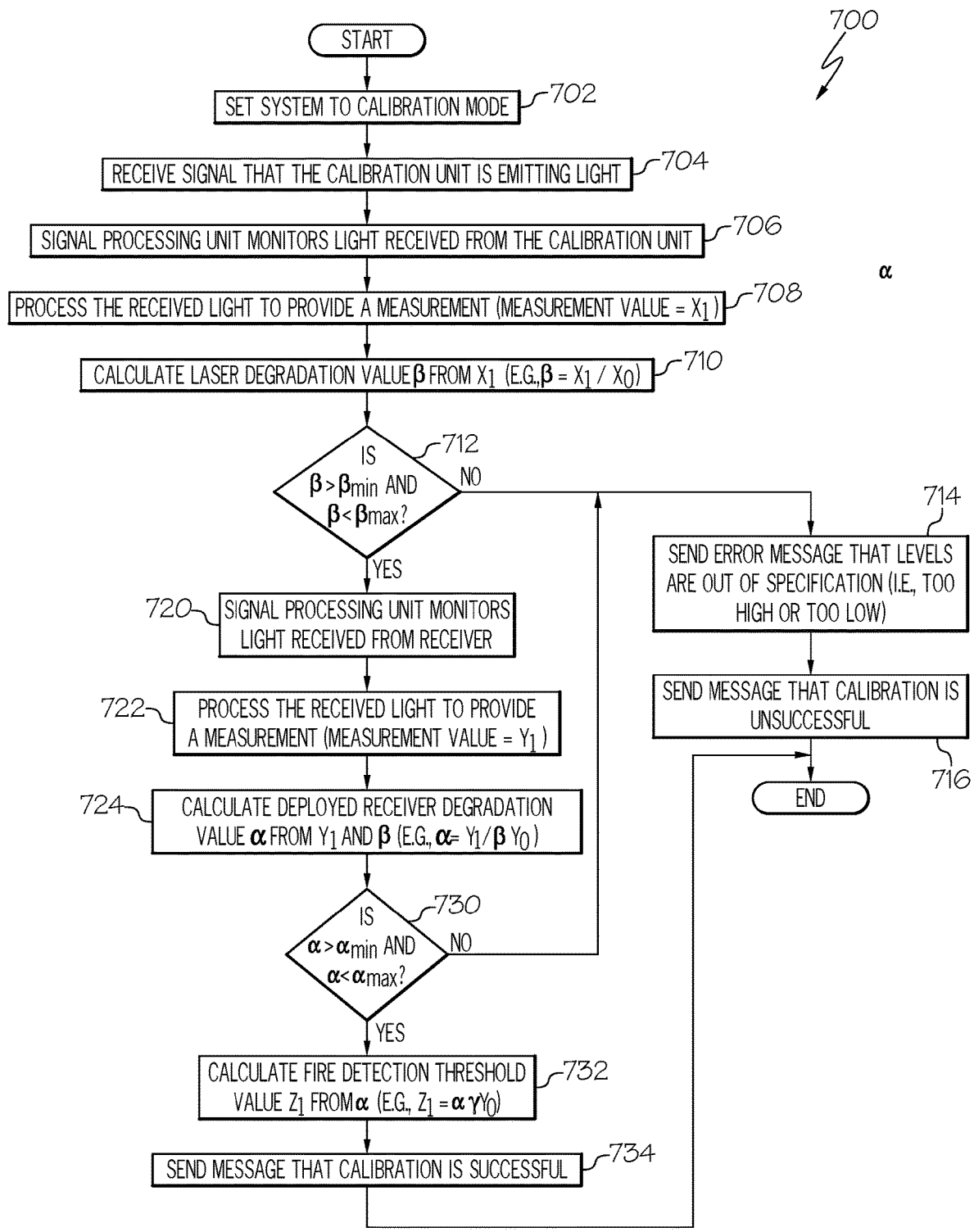
FIG. 7 is a flow diagram depicting an example method for operating the control unit of FIG. 2 during the system calibrating mode of FIG. 6.

Referring to FIG. 7, a flow diagram 700 depicting an example method for operating the control unit 110 of FIG. 2 during the system calibrating mode of FIG. 6 is illustrated. In block 702, the fire detection system 100 is set to calibration mode (i.e., the system calibrating mode). As shown in block 704, a signal is received indicating that the calibrating unit 140 is emitting light. Then in block 706, the signal processing unit 130 monitors light received on line 132 from the fiber splitter 180. The signal processing unit 130 processes the light received from the fiber splitter 180 to provide a measurement value that is set equal to "$X_1$", as shown in block 708. The process then proceeds to block 710 in which a laser degradation value "β" is calculated from $X_1$. As an example, the value of β may be set equal to $X_1/X_0$, wherein "$X_0$" is a value that is set in the factory during manufacture.

A determination is then made in block 712 as to whether the value of β is greater "β min" and less than "$β_{max}$", wherein both $β_{min}$ and $β_{max}$ are both values that are set in the factory during manufacture. If the determination in block 712 is negative (i.e., the value of β is not between the value of β min and the value of $β_{max}$), the process proceeds to block 714. In block 714, an error message is sent indicating that levels (i.e., one or more values of β) are out of specification, meaning that the one or more values of β are too high or too low. Then in block 716, a message is sent indicating that the attempted calibration of the fire detection system 100 is unsuccessful. The process then ends.

However, if the determination back in block 712 is affirmative (i.e., the value of β is between the value of $β_{min}$ and the value of $β_{max}$), the process proceeds to block 720 in which the signal processing unit 130 monitors light received on line 152 from the light receivers 150. The signal processing unit 130 then processes the light received to provide a measurement value "$Y_1$", as shown in block 722. The process then proceeds to block 724 in which a deployed receiver degradation value "α" is calculated from $Y_1$ and β. As an example, the value of α may be set equal to $Y_1/β Y_0$, wherein "$Y_0$" is a value that is set in the factory during manufacture.

A determination is then made in block 730 as to whether the value of α is greater "$α_{min}$" and less than "$α_{max}$", wherein $α_{min}$ and $α_{max}$ are both values that are set in the factory during manufacture. If the determination in block 730 is negative (i.e., the value of α is not between the value of $α_{min}$ and the value of $α_{max}$), the process proceeds to block 714. In block 714, an error message is sent indicating that levels (i.e., one or more values of a) are out of specification, meaning that the one or more values of a are too high or too low. Then in block 716, a message is sent indicating that the attempted calibration of the fire detection system 100 is unsuccessful.

However, if the determination back in block 730 is affirmative (i.e., the value of α is between the value of $α_{min}$ and the value of $α_{max}$), the process proceeds to block 732. In block 732, a fire detection threshold value "$Z_1$" is calculated from α. As an example, the value of $Z_1$ may be set equal to $αγY_0$, wherein "γ" and "$Y_0$" are values that are set in the factory during manufacture. The γ value is between zero and one, and represents a degraded optical reception factor (e.g., the lens of the light receivers 150 is coated by something and lets less light through). Then in block 734, a message is sent indicating that the attempted calibration of the fire detection system 100 is successful. The process then ends.

It should be apparent that the measurement value $X_0$ and the measurement value $Y_0$ are baseline values before any degradation has occurred (i.e., α=β=1 indicating that no degradation has occurred). More specifically, $X_0$ and $Y_0$ are direct measurements from the calibration unit 140 ($X_0$) and the light receivers 150 ($Y_0$). $Z_0$ is the baseline detection threshold, and is calculated using $Y_0$ and γ (e.g., $Z_0=γY_0$). If a linear scaling of power levels is used (i.e., α, β, and $Z_0$ are linear functions), the γ has a value between zero and one. However, it is conceivable that α, β, and $Z_0$ comprise complex functions that may be nonlinear. In this case, the γ value is between zero and one, but just may not be linear with power levels.

It should also be apparent that the measurement value $X_1$ is a degraded laser power emitted value, and that the measurement value $Y_1$ is a degraded optical power received value. As a result, the total power available (whether emitted or received) is lowered. The extent of degradation is tracked and calculated using the laser degradation factor β and the deployed receiver degradation factor α. As an example, β is calculated using $X_0$ and $X_1$ (e.g., $β=X_1/X_0$, and α is calculated using β, $Y_1$, and $Y_0$ (e.g., $α=Y_1/βY_0$). These are only example ways of calculating the degradation factors α and β, and other ways of calculating α and β are possible.

It should further be apparent that $Z_1$ is a new calibrated detection threshold that replaces the baseline detection threshold $Z_0$ to compensate for the degraded laser power emitted from the calibrating unit 140 and the degraded optical reception of the light receivers 150. As an example, $Z_1$ is calculated using the degradation factors α and β, γ, and $Y_0$ (e.g., $Z_1=αγY_0$). These are only example ways of calculating $Z_1$, and other ways of calculating $Z_1$ are possible. It is conceivable that $Z_1$ may comprise a complex function and not just a linear function.

Figure 8:
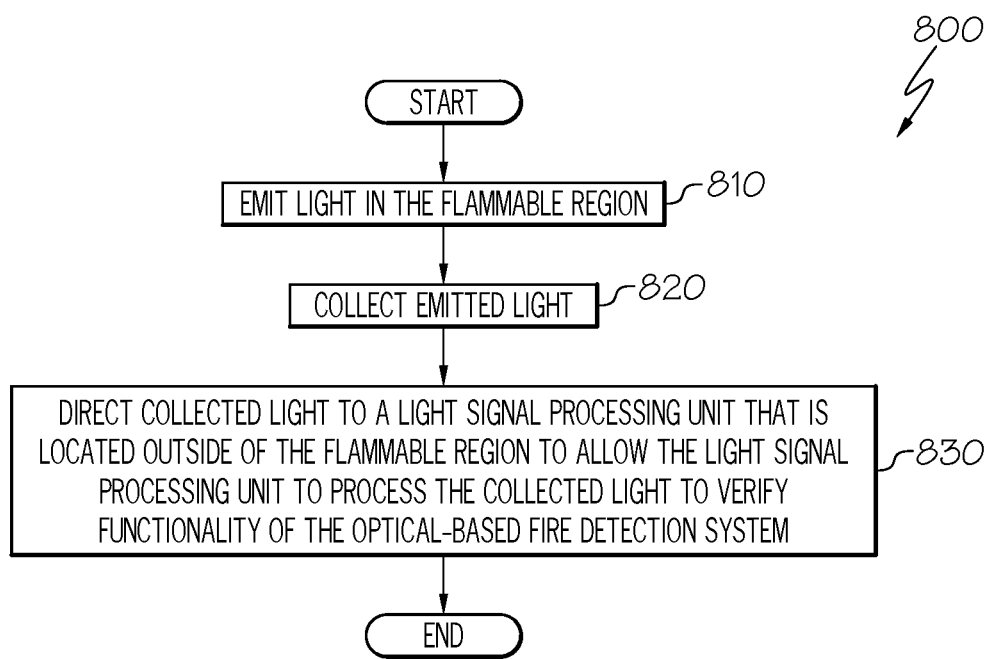
FIG. 8 is a flow diagram depicting another example method for operating the control unit of FIG. 2 during the system calibrating mode of FIG. 6.

Referring to FIG. 8, a flow diagram 800 depicting another example method for operating the control unit 110 of FIG. 2 during the system calibrating mode of FIG. 6 is illustrated. In block 810, light is emitted in the flammable region. In block 820, emitted light is collected. Then in block 830, collected light is directed to a light signal processing unit that is located outside of the flammable region to allow the light signal processing unit to process the collected light to verify functionality of the optical-based fire detection system.

In some embodiments, light having a number of predetermined wavelengths and a number of predetermined intensities is emitted from a light source that is mounted inside of the flammable region.

In some embodiments, light having a number of predetermined wavelengths and a number of predetermined intensities is emitted from a portable light source that has been hand-carried by a user into the flammable region.

In some embodiments, light that is emitted only inside of the flammable region is collected.

In some embodiments, collected light is directed via one or more optical fiber bundles to the light signal processing unit.

In some embodiments, collected light is directed via at least one optical fiber splitter to the light signal processing unit.

In some embodiments, emitted light is directed via the at least one optical fiber splitter from a light signal calibrating unit that is located outside of the flammable region.

In some embodiments, a laser degradation factor indicative of reduced emitted light in the flammable region is calculated, and the emitted light emitted from the light signal calibrating unit is adjusted based upon the laser degradation factor to compensate for the reduced emitted light in the flammable region.

In some embodiments, a deployed receiver degradation factor indicative of reduced collected light in the flammable region is calculated, and the emitted light from the light signal calibrating unit is adjusted based upon the deployed receiver degradation factor to compensate for the reduced collected light in the flammable region.

The above-disclosed fire detection system 100 has a fire detecting mode in which the system 100 is monitoring the flammable region 160 for occurrence of fire in the flammable region, and a system calibrating mode in which functionality of the system 100 can be verified. Notably, the electronics of the control unit 110, the signal processing unit 130, and the calibrating unit 140 of the fire detection system 100 are located separately and outside of the flammable region 160.

A number of advantages are provided by locating electronics outside of the flammable region 160. One advantage is that the electronics are never in contact with the flammable region 160. This can avoid or at least reduce the number of false positives indicating occurrence of fire but no actual fire has occurred. Another advantage is that functionality of the fire detection system 100 can be verified in situ without having to remove any components from the flammable region 160 of the aircraft 10.

Still another advantage is that no metal wires need to be run in flammable environments. Metallic wires can incur induced currents and voltages due to electromagnetic coupling from nearby currents creating electromagnetic fields or directly from electromagnetic fields impinging onto the aircraft 10.

Also notably, the processor 116 of the control unit 110 executes instructions of the fire detection system control program 117 stored in the data storage device 118 to compensate for degradation of laser power from the calibrating unit 140 and degradation of optical characteristics of the light receivers 150. The degradation of laser power may occur if the calibrating unit 140 drifts out of calibrated range over time. The degradation of optical characteristics may occur if the optics of the light receivers 150 become obscured or fouled (e.g., by dirt or the like). Compensation is provided by calculating a new fire detection threshold value (i.e., $Z_1$) to replace the baseline detection threshold value $Z_0$. Thus, the detection threshold of the fire detection system 100 is adjusted based upon the extent of degradation of laser power from the calibrating unit 140 and extent of degradation of optical characteristics of the light receivers 150.

Each of the fire detecting mode and the system calibrating mode may be implemented using coded instructions (e.g., non-transitory computer and/or machine-readable instructions) that comprise the fire detection system control program 117 for execution by the processor 116 of the control unit 110, such as shown in the example fire detection system 100 discussed above in connection with FIGS. 1 and 2. The program 117 may be embodied in software stored on a tangible computer readable storage medium such as a CD-ROM, a floppy disk, a hard drive, a digital versatile disk (DVD), a Blu-ray disk, or a memory associated with the processor 116, but the entire program and/or parts thereof could alternatively be executed by a device other than the processor 116 and/or embodied in firmware or dedicated hardware. As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably.

Many other methods of implementing the example fire detection system 100 may alternatively be used. The order of execution of blocks may be changed, and/or some of blocks described with reference to the example flow diagrams may be changed, eliminated, or combined. Further, as used herein, when the phrase "at least" is used as the transition term in a preamble of a claim, it is open-ended in the same manner as the term "comprising" is open ended.

While an example manner of implementing the example aircraft-based fire detection system 100 is illustrated in FIG. 1, one or more of the elements, processes and/or devices illustrated in FIG. 1 may be combined, divided, re-arranged, omitted, eliminated and/or implemented in any other way. Further, the example control unit 110 and/or, more generally, the example aircraft-based fire detection system 100 of FIG. 1 may be implemented by hardware, software, firmware and/or any combination of hardware, software and/or firmware. Thus, for example, any of the example control unit 110 and/or, more generally, the example aircraft-based fire detection system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

Figure 9:
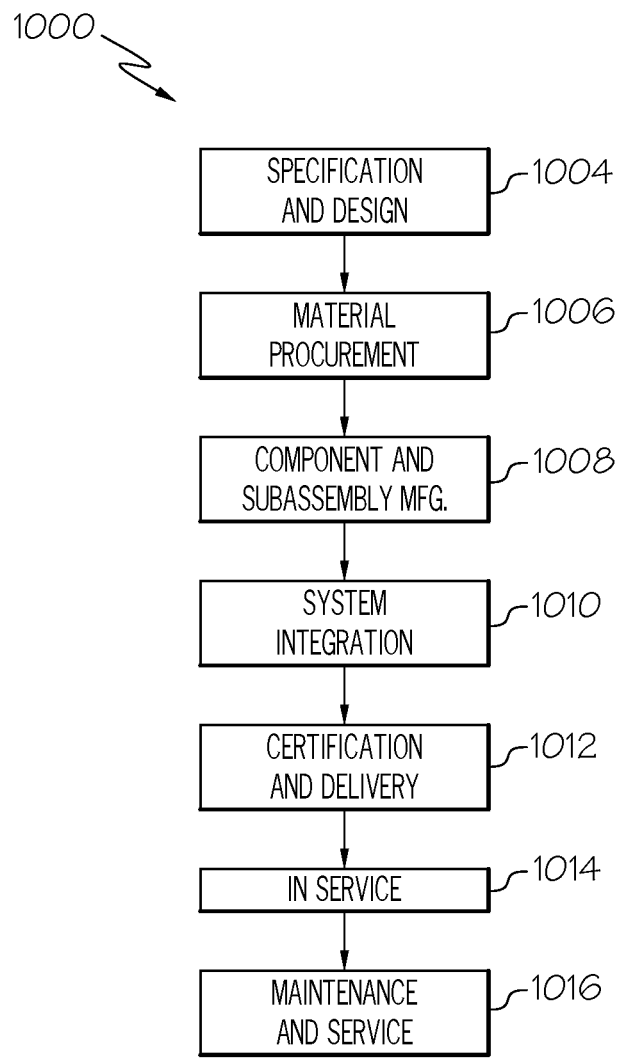
FIG. 9 is a flow diagram of an aircraft manufacturing and service methodology.
Figure 10:
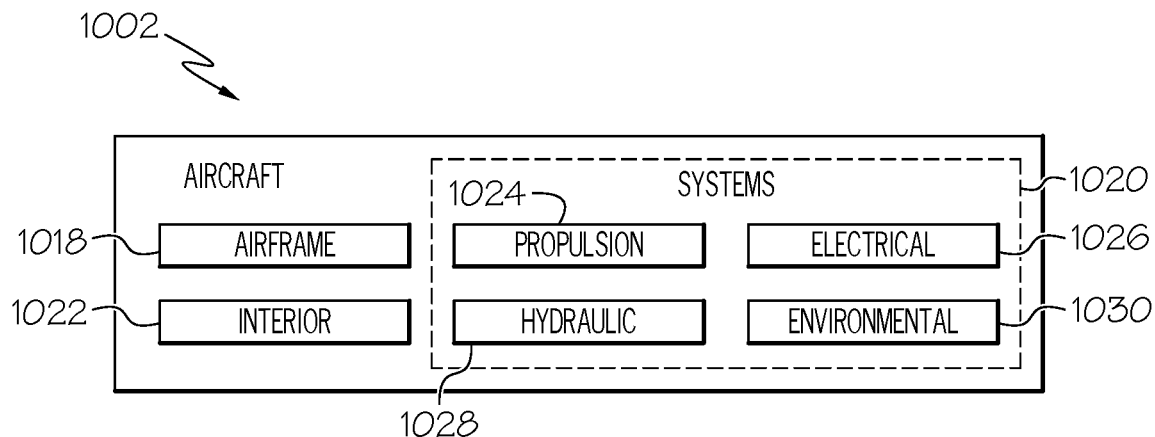
FIG. 10 is a block diagram of an aircraft.

Examples of the disclosure may be described in the context of an aircraft manufacturing and service method 1000, as shown in FIG. 9, and an aircraft 1002, as shown in FIG. 10. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed fire detection systems and methods may be employed during any one or more of the stages of the aircraft manufacturing and service method 1000. As one example, components or subassemblies corresponding to component/subassembly manufacturing 1008, system integration 1010, and/or maintenance and service 1016 may be assembled using the disclosed fire detection systems and methods. As another example, the airframe 1018 may be constructed using the disclosed fire detection systems and methods. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed fire detection systems and methods are described in the context of an aircraft in the aviation industry in accordance with military and space regulations. It is contemplated that the disclosed fire detection systems methods may be implemented for any industry in accordance with the applicable industry standards. The specific fire detection system and method can be selected and tailored depending upon the particular application.

Further, although various aspects of disclosed embodiments have been shown and described, modifications may occur to those skilled in the art upon reading the specification. The present application includes such modifications and is limited only by the scope of the claims.

What is claimed is:

1. A method of operating an optical-based fire detection system, the method comprising:
   monitoring a flammable region for occurrence of a fire in the flammable region;
   collecting light emitted from the flammable region at a light signal collecting unit that is located inside the flammable region;
   directing collected light to a light signal processing unit that is located outside of the flammable region; and
   processing the collected light at the light signal processing unit that is located outside of the flammable region to determine if the collected light is indicative of a fire in the flammable region.

2. The method of claim 1 wherein processing the collected light at the light signal processing unit includes processing wavelengths and intensities of the collected light to determine if the collected light is indicative of a fire in the flammable region.

3. The method of claim 1 wherein collecting emitted light from the flammable region includes collecting emitted light that is only inside of the flammable region.

4. The method of claim 1 wherein directing collected light to a light signal processing unit includes directing collected light via one or more optical fiber bundles to the light signal processing unit.

5. An apparatus for monitoring a flammable region for occurrence of a fire in the flammable region, the apparatus comprising:
   a light signal collecting unit located inside of the flammable region;
   a light signal processing unit located outside of the flammable region; and
   one or more optical fiber bundles optically interconnecting the light signal collecting unit and the light signal processing unit to enable the light signal processing unit to receive at least one light signal from the light signal collecting unit and to process one or more characteristics of the at least one light signal to determine if the at least one light signal is indicative of a fire in the flammable region.

6. The apparatus of claim 5 wherein the light signal collecting unit includes at least one light receiver located inside of the flammable region.

7. The apparatus of claim 6 wherein the at least one light receiver comprises a fish eye lens.

8. A method of verifying functionality of an optical-based fire detection system that monitors a flammable region for occurrence of a fire in the flammable region, the method comprising:
   emitting light in the flammable region;
   collecting emitted light at a light signal collecting unit that is located inside of the flammable region; and
   directing collected light to a light signal processing unit that is located outside of the flammable region to allow the light signal processing unit to process the collected light to verify functionality of the optical-based fire detection system.

9. The method of claim 8 wherein emitting light in the flammable region includes emitting light having a number of predetermined wavelengths and a number of predetermined intensities from a light source that is mounted inside of the flammable region.

10. The method of claim 8 wherein emitting light in the flammable region includes emitting light having a number of predetermined wavelengths and a number of predetermined intensities from a portable light source that has been hand-carried by a user into the flammable region.

11. The method of claim 8 wherein collecting emitted light includes collecting emitted light that is only inside of the flammable region.

12. The method of claim 8 wherein directing collected light to a light signal processing unit includes directing collected light via one or more optical fiber bundles to the light signal processing unit.

13. The method of claim 8 wherein directing collected light via one or more optical fiber bundles to the light signal processing unit includes directing collected light via at least one optical fiber splitter to the light signal processing unit.

14. The method of claim 13 further comprising:
    directing emitted light via the at least one optical fiber splitter from a light signal calibrating unit that is located outside of the flammable region.

15. The method of claim 14 further comprising:
    calculating a laser degradation factor indicative of reduced emitted light in the flammable region; and
    adjusting the emitted light emitted from the light signal calibrating unit based upon the laser degradation factor to compensate for the reduced emitted light in the flammable region.

16. The method of claim 14 further comprising:
    calculating a deployed receiver degradation factor indicative of reduced collected light in the flammable region; and
    adjusting the emitted light from the light signal calibrating unit based upon the deployed receiver degradation factor to compensate for the reduced collected light in the flammable region.

17. An apparatus for verifying functionality of an optical-based fire detection system that is monitoring a flammable region for occurrence of a fire in the flammable region, the apparatus comprising:
    a light signal collecting unit located inside of the flammable region;
    a light signal processing unit located outside of the flammable region; and
    one or more optical fiber bundles optically interconnecting the light signal collecting unit and the light signal processing unit to enable the light signal processing unit to receive at least one light signal from the light signal collecting unit and to process the at least one light signal to verify functionality of the light signal collecting unit and thereby to verify functionality of the optical-based fire detection system.

18. The apparatus of claim 17 wherein the light signal collecting unit includes at least one light emitter located inside of the flammable region.

19. The apparatus of claim 18 wherein the at least one light emitter located inside of the flammable region includes a combination of directional light emitters, indirect light emitters, and omnidirectional light emitters located inside of the flammable region.

20. The apparatus of claim 18 wherein the at least one light emitter located inside of the flammable region includes an array of light emitting diodes located inside of the flammable region.

21. The apparatus of claim 18 wherein the at least one light emitter located inside of the flammable region includes a portable light source that has been hand-carried by a user into the flammable region to enable the user to manually operate the portable light source to emit light of a number of predetermined wavelengths and a number of predetermined intensities in the flammable region.

22. The apparatus of claim 17 wherein the light signal collecting unit includes at least one light receiver located inside of the flammable region.

23. The apparatus of claim 22 wherein the at least one light receiver comprises a fish eye lens.

24. The apparatus of claim 17 wherein (i) the at least one light signal from the light signal collecting unit comprises light having a number of predetermined wavelengths and a number of predetermined intensities, and (ii) the light signal processing unit processes the predetermined wavelengths and the predetermined intensities to verify functionality of the light signal collecting unit and thereby to verify functionality of the optical-based fire detection system.

25. The apparatus of claim 17 further comprising a light signal calibrating unit located outside of the flammable region.

26. The apparatus of claim 25 wherein the light signal calibrating unit emits light that is adjusted based upon at least one of a calculated laser degradation factor and a calculated deployed receiver degradation factor.

27. The apparatus of claim 25 further comprising an optical fiber splitter disposed in the one or more optical fiber bundles to optically interconnect the light signal collecting unit, the light signal processing unit, and the light signal calibrating unit.

28. An optical-based fire detection system having a fire detecting mode in which the system is monitoring a flammable region for occurrence of fire in the flammable region and a system calibrating mode in which functionality of the system can be verified, the optical-based fire detection system comprising:
- a light signal collecting unit located inside of the flammable region;
- a light signal processing unit located outside of the flammable region;
- a light signal calibrating unit located outside of the flammable region; and
- one or more optical fiber bundles optically interconnecting the light signal collecting unit, the light signal processing unit, and the light signal calibrating unit to (i) when the fire detection system is in the fire detecting mode, enable the light signal processing unit to receive at least one light signal from the light signal collecting unit and to process one or more characteristics of the at least one light signal to determine if the at least one light signal is indicative of a fire in the flammable region, and (ii) when the fire detection is in the system calibrating mode, enable the light signal processing unit to receive at least one calibrating light signal from the light signal calibrating unit and to process the at least one calibrating light signal to verify functionality of the light signal collecting unit and thereby to verify functionality of the optical-based fire detection system.

29. The system of claim 28 further comprising an optical fiber splitter disposed in the one or more optical fiber bundles to optically interconnect the light signal collecting unit, the light signal processing unit, and the light signal calibrating unit.

30. The system of claim 28 wherein the light signal calibrating unit emits light that is adjusted based upon at least one of a calculated laser degradation factor and a calculated deployed receiver degradation factor.

* * * * *